(12) United States Patent
Takagi et al.

(10) Patent No.: US 8,812,161 B2
(45) Date of Patent: Aug. 19, 2014

(54) ROBOT APPARATUS

(75) Inventors: Kiyoshi Takagi, Tokyo (JP); Ichiro Okumura, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 441 days.

(21) Appl. No.: 13/226,784

(22) Filed: Sep. 7, 2011

(65) Prior Publication Data
US 2012/0072025 A1 Mar. 22, 2012

(30) Foreign Application Priority Data

Sep. 22, 2010 (JP) ................................. 2010-212315
Aug. 11, 2011 (JP) ................................. 2011-175521

(51) Int. Cl.
*G05B 15/00* (2006.01)
*B25J 9/00* (2006.01)
*B25J 9/16* (2006.01)
*G06F 17/00* (2006.01)

(52) U.S. Cl.
CPC ..... *B25J 9/1635* (2013.01); *G05B 2219/39201* (2013.01); *Y10S 901/09* (2013.01); *Y10S 901/23* (2013.01)
USPC .................. 700/262; 700/245; 901/9; 901/23

(58) Field of Classification Search
USPC ............ 700/245, 250, 260, 262, 247; 901/14, 901/15–18, 123, 28, 30; 294/86.26, 86.28, 294/87.24, 110.1; 318/568.11
See application file for complete search history.

(56) References Cited

U.S. PATENT DOCUMENTS

| | | | |
|---|---|---|---|
| 6,198,202 B1 | 3/2001 | Tamai et al. | |
| 7,081,700 B2 | 7/2006 | Okumura et al. | |
| 7,122,940 B2 | 10/2006 | Okumura et al. | |
| 7,195,441 B2 | 3/2007 | Okumura et al. | |
| 8,311,671 B2 * | 11/2012 | Tokita et al. ................. | 700/245 |
| 2008/0041153 A1 * | 2/2008 | Tokita ......................... | 73/379.01 |
| 2008/0207409 A1 * | 8/2008 | Kadota ......................... | 482/122 |
| 2008/0288107 A1 * | 11/2008 | Tokita et al. ................. | 700/245 |
| 2010/0050765 A1 * | 3/2010 | Kadota et al. ............... | 73/379.01 |

OTHER PUBLICATIONS

Oh, Sehoon, and Yoichi Hori. "Development of Two-Degree-of-Freedom control for robot manipulator with biarticular muscle torque." American Control Conference, 2009. ACC'09.. IEEE, 2009. p. 325-330.*
T. Oshima et al., "Robot Arm Constructed with Bi-Articular Muscles", Transactions of the Japan Society of Mechanical Engineers, C., 1995, vol. 61, pp. 4696-4703.
U.S. Appl. No. 13/230,127, filed Sep. 12, 2011, Kiyoshi Takagi.

* cited by examiner

*Primary Examiner* — Christine Behncke
(74) *Attorney, Agent, or Firm* — Fitzpatrick, Cella, Harper & Scinto

(57) ABSTRACT

There is provided a robot apparatus that can rapidly obtain an ellipse indicating a stiffness characteristic, even if lengths of two links are different from each other.

6 Claims, 8 Drawing Sheets

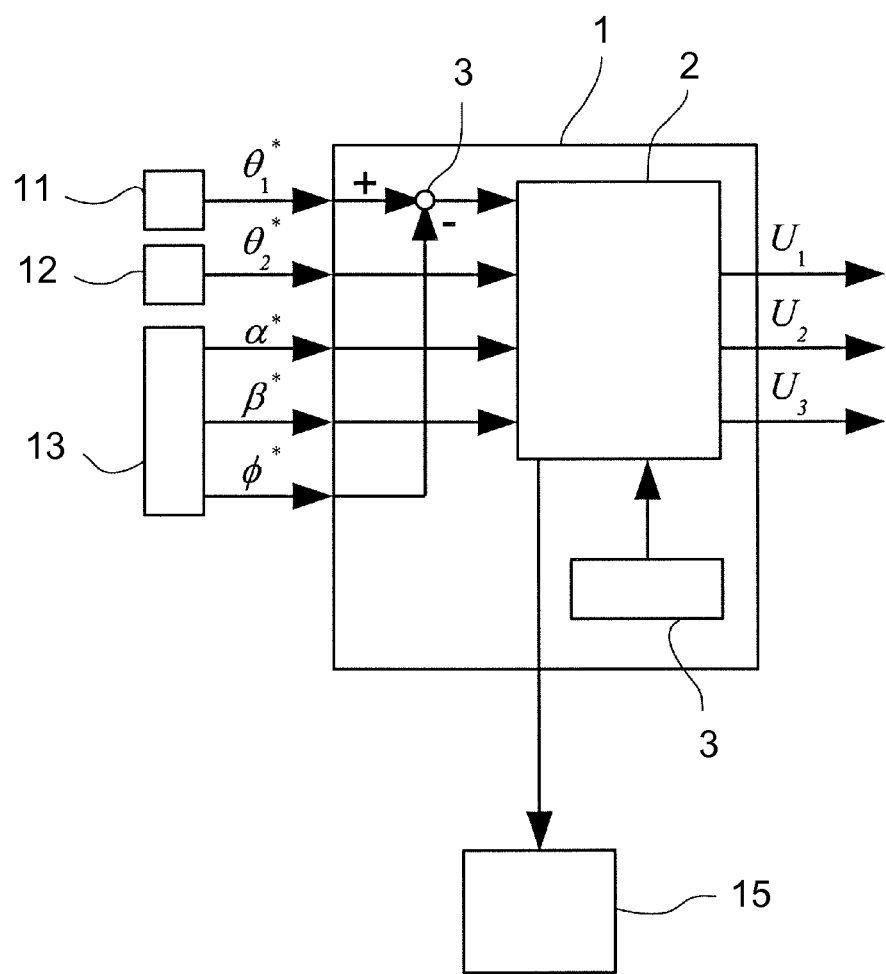

ROBOT APPARATUS

BACKGROUND OF THE INVENTION

1. Field of the Invention

The present invention relates to a robot apparatus that arbitrarily tilts an axis of an ellipse, indicating a stiffness characteristic, at a tip of a link.

2. Description of the Related Art

In a control method of a manipulator, it is important that an end effector (e.g., a hand) provided at a tip of a link can softly touch a subject. The application of this concept to an industrial robot can realize a collaborative work of a robot apparatus and a person. An operation of fitting parts can be facilitated by controlling a direction of flexibility of a hand. The application of this concept to a legged mobile robot can ease a shock to a body, since the robot can softly land on a surface to absorb bumps, whereby the robot can stably walk on an irregular ground.

In order to realize a control for flexibility of a hand, an impedance control in which a force sensor is mounted to a hand, or a control with an artificial muscle actuator has been executed. It has been known that a muscle of a person is an actuator and a viscoelastic variable control mechanism. A pneumatic rubber artificial muscle represented by McKibben artificial muscle in artificial muscles has viscoelastic characteristic similar to that of a muscle.

An artificial muscle actuator generates force only in a contracting direction, so that it has to be arranged in an antagonistic manner. A two-joint link model with three pairs of antagonistic muscles has been proposed, in which artificial muscle actuators are arranged so as to be opposite to each other, and bi-articular actuators are arranged so as to be opposite to each other to the first link and the second link (Robot arm constructed with bi-articular muscles, Toru Oshima, Minayori Kumamoto, Transactions of the Japan Society of Mechanical Engineers. C, vol. 61, 1995, pp. 4696-4703 (hereinafter referred to as Non-Patent Document 1)). The bi-articular actuator is an actuator that is arranged in order to simultaneously drive the first link and the second link. The stiffness at a tip of the second link is represented by an ellipse (hereinafter referred to as "stiffness ellipse") indicating a stiffness characteristic (distribution of stiffness).

In the Non-Patent Document 1, a long axis, a short axis, and a tilt angle of the stiffness ellipse are arbitrarily set. Adjusting the tilt of the stiffness ellipse can realize the stiffness characteristic for allowing the disturbance direction and the moving direction of the hand to agree with each other when external force is applied to the hand. Specifically, the elasticities of the artificial muscle actuators may be made equal to each other under the condition that the lengths of two links are made equal to each other, and the tilt angle may be set such that the long axis or the short axis of the stiffness ellipse is overlapped on a line linking the joint at a base end of the first link and the tip of the second link. Thus, compliance control can be performed only by controlling the elasticities of the artificial muscle actuators.

However, the Non-Patent Document 1 is based on the premise that the lengths of two links are equal to each other. The Non-Patent Document 1 does not describe the method of independently setting the elasticities of the artificial muscle actuators of three pairs of antagonistic muscles in order to realize the optimal stiffness ellipse, in case where the length of two links are different from each other.

Specifically, when the lengths of two links are equal to each other, it is possible to algebraically solve a relational expression between the slight hand displacement and the slight external force with respect to the stiffness of each actuator pair, wherein the relational expression is obtained by introducing Jacobian matrix under the condition that the axis of the stiffness ellipse tilts by the tilt angle φ. Accordingly, even when the lengths of two links are different from each other, it is considered that, as a method of realizing an optimal stiffness ellipse, a relational expression between the slight hand displacement and the slight external force is solved with respect to the stiffness of each actuator pair, wherein the relational expression is obtained by introducing Jacobian matrix under the condition that the axis of the stiffness ellipse tilts by the tilt angle φ.

However, it is difficult to algebraically obtain a solution of the relational expression. Therefore, the real method is to form the optimal stiffness ellipse with a method of performing a convergent calculation. The calculation amount for the convergent calculation is enormous, which means that it takes much time for the convergent calculation. Therefore, the stiffness ellipse cannot be formed with high speed by the convergent calculation. Accordingly, the desired stiffness ellipse cannot rapidly be obtained, whereby the controllability of the stiffness by the actuators is poor.

In view of this, the present invention aims to provide a robot apparatus that can rapidly obtain an ellipse indicating a stiffness characteristic, even if lengths of two links are different from each other.

SUMMARY OF THE INVENTION

The present invention provides a robot apparatus including: a first link that is made of a longitudinal member, and has a base end supported to a fixing member so as to be swingable; a second link that is made of a longitudinal member, and that has a base end supported to a tip of the first link so as to be swingable in a plane where the first link swings; a pair of first actuators that is connected to the fixing member and the first link for allowing the first link to swing owing to the difference in contraction forces; a pair of second actuators that is connected to the first link and the second link for allowing the second link to swing owing to the difference in contraction forces; and a pair of third actuators that is connected to the fixing member and the second link for allowing the first link and the second link to swing owing to the difference in contraction forces. The apparatus includes: a storing unit that preliminarily stores operational expressions that are derived under the condition that an orthogonal coordinate system is defined in the plane, a stiffness characteristic at the tip of the second link is represented by an ellipse having its center defined as the tip of the second link on the orthogonal coordinate system, and one of a long axis and a short axis of the ellipse is parallel to a reference axis of the orthogonal coordinate system, the operational expressions including: a first operational expression for obtaining a first stiffness instruction value, which indicates a sum of contraction force instruction values of the pair of first actuators, a second operational expression for obtaining a second stiffness instruction value, which indicates a sum of contraction force instruction values of the pair of second actuators, and a third operational expression for obtaining a third stiffness instruction value, which indicates a sum of contraction force instruction values of the pair of third actuators, wherein a first swing angle of the first link with the reference axis being defined as a reference and a second swing angle of the second link with an axis extending in the longitudinal direction of the first link being defined as a reference are specified as variables, and the length of the first link and the length of the second link are specified as constants; a subtracting unit that acquires a signal indicating a value of the first swing angle of the first link and a signal indicating a value of a target tilt angle of one axis with the reference axis being defined as a reference, and outputs a signal indicating a new value of the first swing angle, the new value being specified as the result obtained by subtracting the value of the target tilt angle from the value of the first swing angle; a calculating unit that acquires a signal indicating the value of the first swing angle output from the subtracting unit and a signal indicating the value of the second swing angle of the second link, and calculates the first stiffness instruction value, the second stiffness instruction value, and the third stiffness instruction value from the first operational expression, the second operational expression, and the third operational expression stored in the storing unit; and a contraction force instruction value generating unit that generates contraction force instruction values of each of the pair of first actuators, the pair of second actuators, and the pair of third actuators from the stiffness instruction values calculated by the calculating unit.

According to the present invention, the subtracting unit subtracts the value of the target tilt angle of the ellipse that indicates the stiffness characteristic from the value of the first swing angle of the first link, thereby obtaining a new value of the first swing angle. The storing unit stores the operational expressions for obtaining the first, second, and third stiffness instruction values under the condition in which the axis of the ellipse, indicating the stiffness characteristic, is parallel to the reference axis of the orthogonal coordinate system. Accordingly, the calculating unit that acquires the signal indicating the value of the first swing angle from the subtracting unit obtains the stiffness instruction values, in case where the axis of the ellipse indicating the stiffness characteristic is tilted by the value of the target tilt angle from the reference axis of the orthogonal coordinate system, with the use of the operational expressions stored in the storing unit. As described above, even if the lengths of two links are different from each other, the calculating unit can obtain the stiffness instruction values by using the operational expressions, which are not obtained by the convergent calculation but are algebraically obtained. Therefore, the calculation load is reduced, and the ellipse indicating the stiffness characteristic can rapidly be obtained.

Further features of the present invention will become apparent from the following description of exemplary embodiments with reference to the attached drawings.

BRIEF DESCRIPTION OF THE DRAWINGS

FIG. 6 is a block diagram illustrating a controlling unit of the controlling device.

DESCRIPTION OF THE EMBODIMENTS

Preferred embodiments of the present invention will now be described in detail in accordance with the accompanying drawings.

Figure 1:
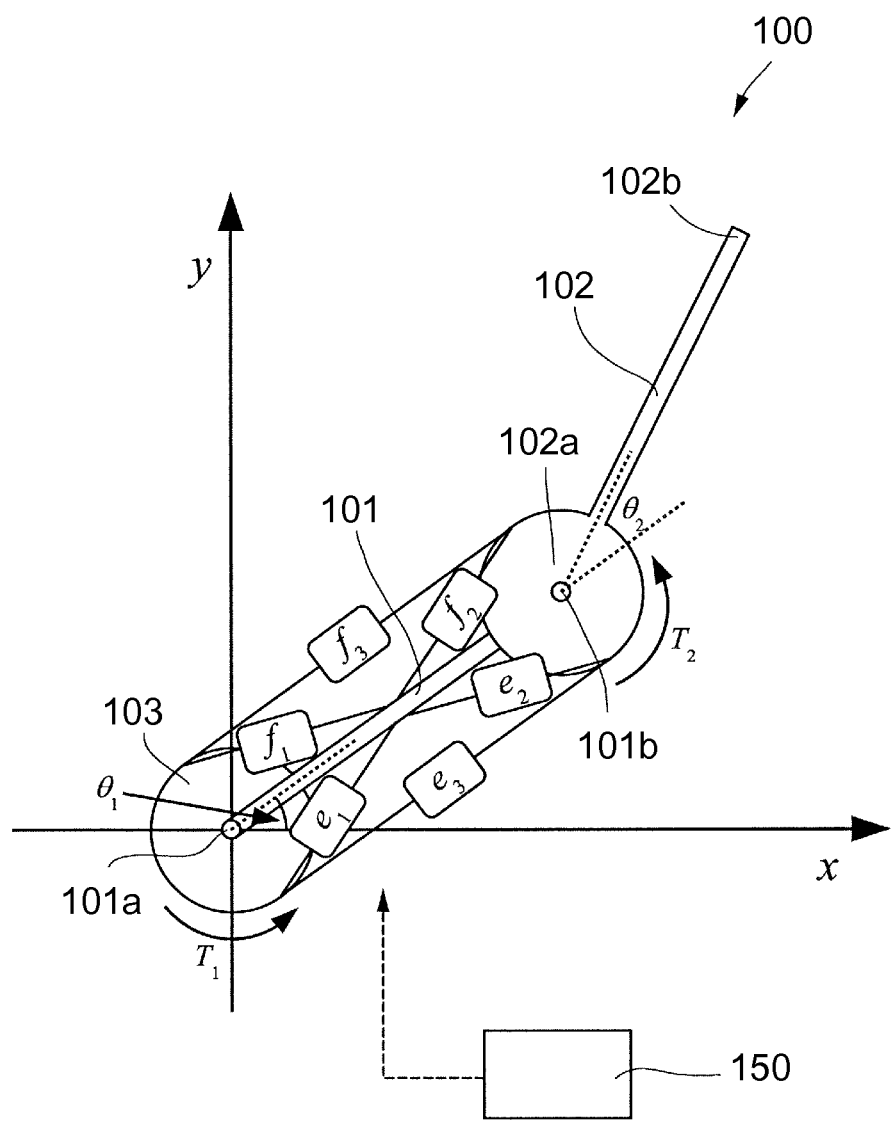
FIG. 1 is an explanatory view illustrating a schematic configuration of a robot apparatus according to an embodiment of the present invention.

FIG. 1 is an explanatory view illustrating a schematic configuration of a robot apparatus according to an embodiment of the present invention. The present embodiment shows an example of a control of a stiffness at a hand of a robot apparatus, serving as a two-joint link manipulator, the robot apparatus having three pairs of antagonistic muscles using an artificial muscle actuator.

(1) Modeling

FIG. 1 illustrates the robot apparatus having three pairs of antagonistic muscles and serving as a two-joint link manipulator according to the present embodiment. The robot apparatus 100 includes a first link 101, a second link 102, and a pulley 103 that is a fixing member.

The first link 101 is made of a longitudinal member, wherein one base end 101a thereof is supported by the pulley 103 so as to be swingable in a plane (hereinafter referred to as "working plane") of an x-y orthogonal coordinate system. The second link 102 is made of a longitudinal member, wherein one base end 102a thereof is supported by a tip 101b of the first link 101 so as to be swingable within the working plane. An unillustrated end effector (e.g. hand) is provided at the tip 102b of the second link 102. Specifically, the first link 101 is arranged between a first joint and a second joint, and is supported by the first joint so as to be swingable, while the second link 102 is supported by the second joint so as to be swingable.

The robot apparatus 100 also includes a pair of first actuators $e_1$ and $f_1$, a pair of second actuators $e_2$ and $f_2$, and a pair of third actuators $e_3$ and $f_3$. One end of each of the pair of first actuators $e_1$ and $f_1$ is connected to the pulley 103, while the other end is connected to the center of the first link 101 in the longitudinal direction, whereby the actuators $e_1$ and $f_1$ are arranged to be opposite to each other for allowing the first link 101 to swing owing to the difference in the contraction force.

One end of each of the pair of second actuators $e_2$ and $f_2$ is connected to the center of the link 101 in the longitudinal direction, while the other end is connected to the base end 102a of the second link 102, whereby the actuators $e_2$ and $f_2$ are arranged to be opposite to each other for allowing the second link 102 to swing owing to the difference in the contraction force. One end of each of the pair of third actuators $e_3$ and $f_3$ is connected to the pulley 103, while the other end is connected to the base end 102a of the second link 102, whereby the actuators $e_3$ and $f_3$ are arranged to be opposite to each other for allowing the first link 101 and the second link 102 to swing owing to the difference in the contraction force.

The robot apparatus 100 also includes a controlling device 150 that adjusts the contraction forces of the actuators $e_1$, $f_1$, $e_2$, $f_2$, $e_3$, and $f_3$ by contraction force instruction values so as to control the operations of the links 101 and 102.

The first actuators $e_1$ and $f_1$ are mono-articular actuators for driving the first link 101. The second actuators $e_2$ and $f_2$ are mono-articular actuators for driving the second link 102. The third actuators $e_3$ and $f_3$ are bi-articular actuators for simultaneously driving the first link 101 and the second link 102. It has been known that a bi-articular actuator called bi-articular muscle is present on a brachial region or a thigh in the lower extremity of a person. A muscle arrangement in extremities of a person is complicated. An effective muscle theory is introduced by the Non-Patent Document 1, wherein a two-joint link model having three pairs of antagonistic muscles is presented.

Figure 2:
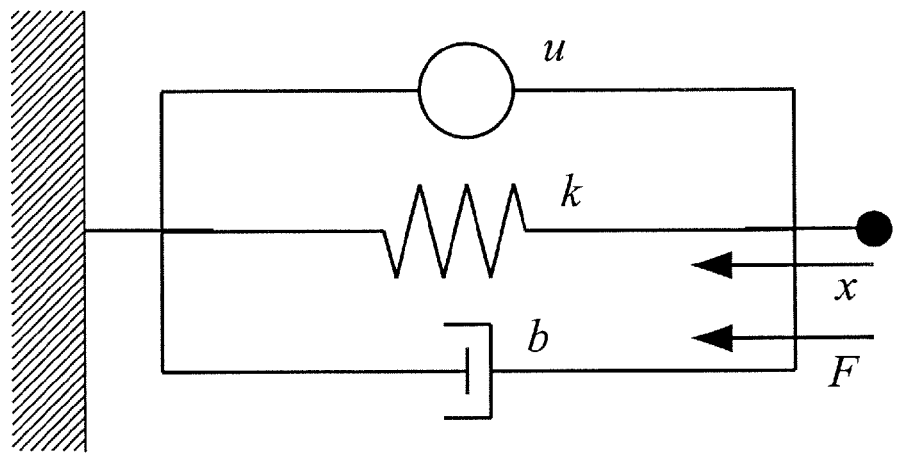
FIG. 2 is a view illustrating a viscoelastic model of an actuator of the robot apparatus.

The actuators $e_1$, $f_1$, $e_2$, $f_2$, $e_3$, and $f_3$ are pneumatic rubber artificial muscle actuators, illustrated in FIG. 2, having a viscoelastic characteristic of a muscle. The artificial muscle actuator is an actuator having a characteristic similar to a viscoelastic characteristic of a muscle. A muscle is modeled by using a force generating component, an elastic component, and a viscous component as illustrated in FIG. 2. Here, u is defined as a contraction force of the force generating component, and x is defined as a contraction amount of a muscle with the contraction direction being specified as positive. A contraction speed is represented by an equation below.

$\dot{x}$

Here, k is defined as an elastic force constant, b is defined as a viscous force constant, and F is defined as a muscle contraction force. In this case, the viscoelastic characteristic of the muscle is modeled as:

$$F \cdot u - kux - bu\dot{x} \quad (1)$$

wherein it is characterized by having a non-linear component in which the elastic force and the viscous force of the muscle contraction force is proportional to the contraction force u of the force generating component.

For the actuators $e_1$, $f_1$, $e_2$, $f_2$, $e_3$, and $f_3$ illustrated in FIG. 1, $u_{en}$ and $u_{fn}$ (n=1, 2, 3) are defined as the contraction force instruction values for generating the contraction force of the force generating element. $k_{en}$, $k_{fn}$, $b_{en}$, and $b_{fn}$ (n=1, 2, 3) are defined as the elastic force constants and viscous force constants of the artificial muscle actuators. The swing angle of the first and second links 101 and 102 are defined as $\theta_1$, $\theta_2$, moments of inertia of the first and second links 101 and 102 are defined as I1 and I2, the lengths of the first and second links 101 and 102 are defined as $2l_1$ and $2l_2$, and the masses of the first and second links 101 and 102 are defined as $m_1$ and $m_2$.

The first swing angle $\theta_1$ is a swing angle of the first link 101 with an x axis, which is a reference axis, being defined as a reference, while the second swing angle $\theta_2$ is a swing angle of the second link 102 with an axis extending in the longitudinal direction of the first link 101 being defined as a reference.

The length of an moment arm, that is, the length between the center of swing of the first link 101 and the connection point of the actuators $e_1$ and $f_1$ of the pulley 103, and the length between the center of the swing of the second link 102 and the connection point of the actuators $e_2$ and $f_2$ of the second link 102, are defined as r.

In the present embodiment, when the elastic force constant and the viscous force constant of each muscle are respectively defined as k and b, an equation of motion of the two-joint link manipulator is equations (2) and (3) described below.

$$(m_1 l_1^2 + I_1 + 4m_2 l_1^2 + 4m_2 l_1 l_2 \cos\theta_2 + m_2 l_2^2 + I_2)\ddot{\theta}_1 + \qquad (2)$$
$$(m_2 l_2^2 + I_2 + 2m_2 l_1 l_2 \cos\theta_2)\ddot{\theta}_2 - 2m_2 l_1 l_2 (2\dot{\theta}_1 + \dot{\theta}_2)\sin\theta_2 \dot{\theta}_2 =$$
$$(u_{f1} - u_{e1})r - (u_{f1} + u_{e1})kr^2\theta_1 - (u_{f1} + u_{e1})br^2\dot{\theta}_1 +$$
$$(u_{f3} - u_{e3})r - (u_{f3} + u_{e3})kr^2(\theta_1 + \theta_2) - (u_{f3} + u_{e3})br^2(\dot{\theta}_1 + \dot{\theta}_2)$$

$$(m_2 l_2^2 + I_2 + 2m_2 l_1 l_2 \cos\theta_2)\ddot{\theta}_1 + (m_2 l_2^2 + I_2)\ddot{\theta}_2 + 2m_2 l_1 l_2 \sin\theta_2 \dot{\theta}_1^2 = \qquad (3)$$
$$(u_{f2} - u_{e2})r - (u_{f2} + u_{e2})kr^2\theta_2 - (u_{f2} + u_{e2})br^2\dot{\theta}_2 +$$
$$(u_{f3} - u_{e3})r - (u_{f3} + u_{e3})kr^2(\theta_1 + \theta_2) - (u_{f3} + u_{e3})br^2(\dot{\theta}_1 + \dot{\theta}_2)$$

(2) Design of Control System

Figure 3:
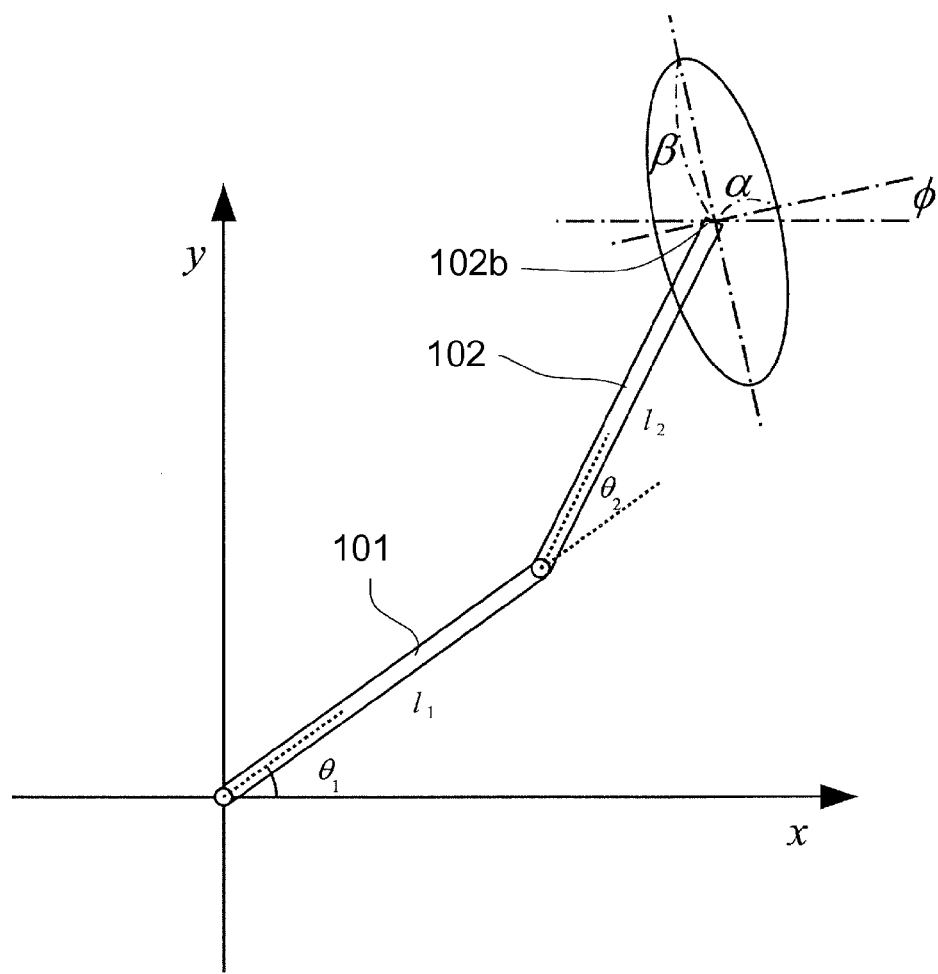
FIG. 3 is a view for describing a stiffness ellipse at a tip of a second link.

In the robot apparatus 100 that is a two-joint link manipulator, a hand is in direct contact with an outside world, so that it is important to control the stiffness of the hand, i.e., the stiffness of the tip 102b of the second link 102. The stiffness of the hand is represented by an ellipse (stiffness ellipse) indicating a stiffness characteristic showing a magnitude of a stiffness illustrated in FIG. 3.

In the present embodiment, an x-y orthogonal coordinate system is defined within a working plane, and the stiffness characteristic at the tip 102b of the second link 102 is represented by the stiffness ellipse having the tip 102b of the second link 102 as a center on the x-y orthogonal coordinate system. The stiffness ellipse indicates the distribution of the stiffness in each direction, wherein the stiffness increases as the tip 102b of the second link 102 and the stiffness ellipse are separated more from each other.

A short radius (stiffness coefficient in a short axis direction) of the stiffness ellipse is defined as $\alpha$, a long radius (stiffness coefficient in a long axis direction) of the stiffness ellipse is defined as $\beta$, and the reference axis on the x-y orthogonal coordinate system is defined as x axis. A tilt angle of one (the short axis in FIG. 3) of the long axis and the short axis of the stiffness ellipse with respect to the x axis, which is the reference axis, is defined as $\phi$. Specifically, the short radius $\alpha$ of the ellipse represents the stiffness coefficient of the tip 102b of the second link 102 in the x axis direction on the working plane with the tilt angle $\phi$ being defined as 0, while the long radius $\beta$ represents the stiffness coefficient of the tip 102b of the second link 102 in the y axis direction on the working plane with the tilt angle $\phi$ being defined as 0.

Slight displacements at the tips of the links caused by slight external forces $\Delta F_x$, $\Delta F_y$, which are parallel to the x-y axis, are defined as $\Delta x_t$, $\Delta y_t$. In this case, the condition in which the stiffness ellipse is parallel to the x-y axis, and the stiffness coefficients in the x axis direction and y axis direction on the working plane of the hand are $\alpha$ and $\beta$ respectively is represented by an equation below.

$$\begin{bmatrix} \Delta x_t \\ \Delta y_t \end{bmatrix} = \begin{bmatrix} 1/\alpha & 0 \\ 0 & 1/\beta \end{bmatrix} \begin{bmatrix} \Delta F_x \\ \Delta F_y \end{bmatrix} \qquad (4)$$

When the contraction force instruction is issued, the artificial muscle actuator generates force, and with this, the elastic force increases in proportion to the force generated. When a pair of artificial muscle actuators is arranged to be opposite to each other, the sum of the elastic forces of the opposing muscles varies the stiffness coefficient around the joint. According to the equation (2), the stiffness coefficient around the first joint according to the opposing pairs of the first actuators $e^1$ and $f^1$ becomes $(u_{f1}+u_{e1}) \times k \times r^2$, for example.

Thus, in the robot apparatus 100 that is a two-joint link manipulator having three pairs of antagonistic muscles, the contraction force instruction is issued to each actuator to vary the elastic force, whereby the stiffness of the hand is made variable. In the present embodiment, the stiffness instruction value, which is the sum of the contraction force instruction values $u_{en}$ and $u_{fn}$, according to a pair of actuators $\{e_n, f_n\}$ (n=1, 2, 3) is defined as $U_n$, and $U_n$ is represented by an equation below.

$$u_{fn}+u_{en}=U_n, n=1,2,3 \quad (5)$$

Specifically, the contraction force for pulling the links 101 and 102 by the pair of actuators $\{e_n, f_n\}$ (n=1, 2, 3) specifies the stiffness (stiffness ellipse) at the tip 102b of the second link 102.

When the lengths of the respective links are equal to each other in the two-joint link manipulator having three pairs of antagonistic muscles, the stiffness instruction values $U_1$, $U_2$, and $U_3$, which are the sum of the contraction force instruction values, are controlled as described below.

$$U_1=U_2=U_3 \quad (6)$$

In this case, the axis of the stiffness ellipse directs the direction linking the first joint and the hand, regardless of the posture of the manipulator. However, when the lengths of the links are different from each other, a method of setting an arbitral stiffness ellipse is unclear.

In the present embodiment, the length of the first link 101 in the longitudinal direction is defined as $2l_1$, and the length of the second link 102 in the longitudinal direction is defined as $2l_2$. The short radius and the long radius of the stiffness ellipse at the tip 102b of the second link 102 are defined as $\alpha$ and $\beta$, respectively, whereby the first stiffness instruction value $U_1$, the second stiffness instruction value $U_2$, and the third stiffness instruction value $U_3$, which are the sum of the contraction force instruction values for setting the tilt angle as $\phi$, are developed. In this case, a numerical equation for obtaining the stiffness instruction values $U_1$, $U_2$, and $U_3$ becomes complicated, so that it is difficult to directly obtain the stiffness instruction values $U_1$, $U_2$, and $U_3$.

Therefore, an operational expression for obtaining the stiffness instruction values $U_1$, $U_2$, and $U_3$ under the condition in which the short radius of the stiffness ellipse is $\alpha$, the long radius is $\beta$, and the tilt angle is 0 (specifically, one of the short axis and the long axis is parallel to the x axis that is the reference axis) is derived. The method of deriving the operational expression is described below.

Slight rotation angles of the joint caused by slight external forces $\Delta F_x$, $\Delta F_y$ are defined as $\Delta\theta_1$, $\Delta\theta_2$. When there is a slight rotation, the actuator having the muscle viscoelasticity generates slight torque $\Delta T_{p1}$ and $\Delta T_{p2}$ on the links 101 and 102 by the muscle elastic force, the slight torque being represented by equations (7) and (8) described below.

$$\Delta T_{p1}=\{U_1\Delta\theta_1+U_3(\Delta\theta_1+\Delta\theta_2)\}kr^2 \quad (7)$$

$$\Delta T_{p2}\{U_2\Delta\theta_2+U_3(\Delta\theta_1+\Delta\theta_2)\}kr^2 \quad (8)$$

When these equations are described with a matrix in which the relationship between the slight angle and the torque is described with a stiffness matrix $K_S$, an equation (9) described below is obtained.

$$\begin{bmatrix} \Delta T_{p1} \\ \Delta T_{p2} \end{bmatrix} = \begin{bmatrix} U_1+U_3 & U_3 \\ U_3 & U_2+U_3 \end{bmatrix} \begin{bmatrix} \Delta\theta_1 \\ \Delta\theta_2 \end{bmatrix} = K_S \begin{bmatrix} \Delta\theta_1 \\ \Delta\theta_2 \end{bmatrix} \quad (9)$$

A Jacobian matrix J is introduced here. The Jacobian matrix J is expressed by an equation (10) below.

$$J(\theta_1, \theta_2) = \begin{bmatrix} -2l_1\sin\theta_1 - 2l_2\sin(\theta_1+\theta_2) & -2l_2\sin(\theta_1+\theta_2) \\ 2l_1\cos\theta_1 + 2l_2\cos(\theta_1+\theta_2) & 2l_2\cos(\theta_1+\theta_2) \end{bmatrix} \quad (10)$$

When the relationship between the slight hand displacement and the slight external force is described with a compliance matrix $J_S$ according to this matrix, an equation (11) below is obtained.

$$\begin{bmatrix} \Delta x_t \\ \Delta y_t \end{bmatrix} = -J(\theta_1, \theta_2)K_S^{-1}J^T(\theta_1, \theta_2)\begin{bmatrix} \Delta F_x \\ \Delta F_y \end{bmatrix}$$

$$= J_S(\theta_1, \theta_2, U_1, U_2, U_3)\begin{bmatrix} \Delta F_x \\ \Delta F_y \end{bmatrix} \quad (11)$$

$J_S(1,2)=J_S(2,1)$ is found through the comparison between the equations (11) and (4), so that system of equations (12) to (14) below are obtained.

$$J_S(1,1)=1/\alpha \quad (12)$$

$$J_S(2,2)=1/\beta \quad (13)$$

$$J_S(1,2)=J_S(2,1)=0 \quad (14)$$

The equations (12) to (14) can be solved for stiffness instruction values $U_1$, $U_2$, and $U_3$, which are described below.

$$\begin{aligned} U_1 = \{&(\beta-\alpha)l_1l_2\cos(5\theta_2+2\theta_1)+ \\ &(\beta-\alpha)l_1^2\cos(4\theta_2+2\theta_1)+(\beta-\alpha)l_1^2\cos(4\theta_2-2\theta_1)+ \\ &(4\alpha-4\beta)l_1l_2\cos(3\theta_2+2\theta_1)+(\beta-\alpha)l_1l_2\cos(3\theta_2-2\theta_1)+ \\ &(4\alpha-4\beta)l_1^2\cos(2\theta_2+2\theta_1)+(4\alpha-4\beta)l_1^2\cos(2\theta_2-2\theta_1)+ \\ &(6\beta-6\alpha)l_1l_2\cos(\theta_2+2\theta_1)+(4\alpha-4\beta)l_1l_2\cos(\theta_2-2\theta_1)+ \\ &(\beta+\alpha)l_1l_2\cos(5\theta_2)+(2\beta+2\alpha)l_1^2\cos(4\theta_2)+ \\ &(-3\beta-3\alpha)l_1l_2\cos(3\theta_2)+(-8\beta-8\alpha)l_1^2\cos(2\theta_2)+ \\ &(2\beta+2\alpha)l_1l_2\cos(\theta_2)+(6\beta-6\alpha)l_1^2\cos(2\theta_1)+(6\beta+6\alpha)l_1^2\}/ \\ &\{kr^2\cos(4\theta_2)-4kr^2\cos(2\theta_2)+3kr^2\}, \end{aligned} \quad (15)$$

$$\begin{aligned} U_2 = -\{&(\beta-\alpha)l_1l_2\cos(5\theta_2+2\theta_1)+(4\alpha-4\beta)l_1l_2\cos(3\theta_2+2\theta_1)+ \\ &(\beta-\alpha)l_1l_2\cos(3\theta_2-2\theta_1)+(6\beta-6\alpha)l_1l_2\cos(\theta_2+2\theta_1)+ \\ &(4\alpha-4\beta)l_1l_2\cos(\theta_2-2\theta_1)+(\beta+\alpha)l_1l_2\cos(5\theta_2)+ \\ &(-3\beta-3\alpha)l_1l_2\cos(3\theta_2)+(2\beta+2\alpha)l_1l_2\cos(\theta_2)\}/ \\ &\{kr^2\cos(4\theta_2)-4kr^2\cos(2\theta_2)+3kr^2\}, \end{aligned} \quad (16)$$

$$\begin{aligned} U_3 = \{&(\beta-\alpha)l_2^2\cos(6\theta_2+2\theta_1)+ \\ &(\beta-\alpha)l_1l_2\cos(5\theta_2+2\theta_1)+(4\alpha-4\beta)l_2^2\cos(4\theta_2+2\theta_1)+ \\ &(4\alpha-4\beta)l_1l_2\cos(3\theta_2+2\theta_1)+(\beta-\alpha)l_1l_2\cos(3\theta_2-2\theta_1)+ \\ &(6\beta-6\alpha)l_2^2\cos(2\theta_2+2\theta_1)+(\beta-\alpha)l_2^2\cos(2\theta_2-2\theta_1)+ \\ &(6\beta-6\alpha)l_1l_2\cos(\theta_2+2\theta_1)+(4\alpha-4\beta)l_1l_2\cos(\theta_2-2\theta_1)+ \\ &(\beta+\alpha)l_1l_2\cos(5\theta_2)+(2\beta+2\alpha)l_2^2\cos(4\theta_2)+ \\ &(-3\beta-3\alpha)l_1l_2\cos(3\theta_2)+(-8\beta-8\alpha)l_2^2\cos(2\theta_2)+ \\ &(2\beta+2\alpha)l_1l_2\cos(\theta_2)+(4\alpha-4\beta)l_2^2\cos(2\theta_1)+(6\beta+6\alpha)l_2^2\}/ \\ &\{kr^2\cos(4\theta_2)-4kr^2\cos(2\theta_2)+3kr^2\} \end{aligned} \quad (17)$$

When the swing angles $\theta_1$ and $\theta_2$ and the stiffness coefficients $\alpha$ and $\beta$ of the links 101 and 102 are substituted into the equations (15) to (17), the stiffness instruction values $U_1$, $U_2$, and $U_3$ that allow one axis (short axis) of the stiffness ellipse to be parallel to the x axis on the x-y orthogonal coordinate system can be obtained. Specifically, the first stiffness instruction value $U_1$ is obtained from the equation (15), the second stiffness instruction value $U_2$ is obtained from the equation (16), and the third stiffness instruction value $U_3$ is obtained from the equation (17).

Figure 4:
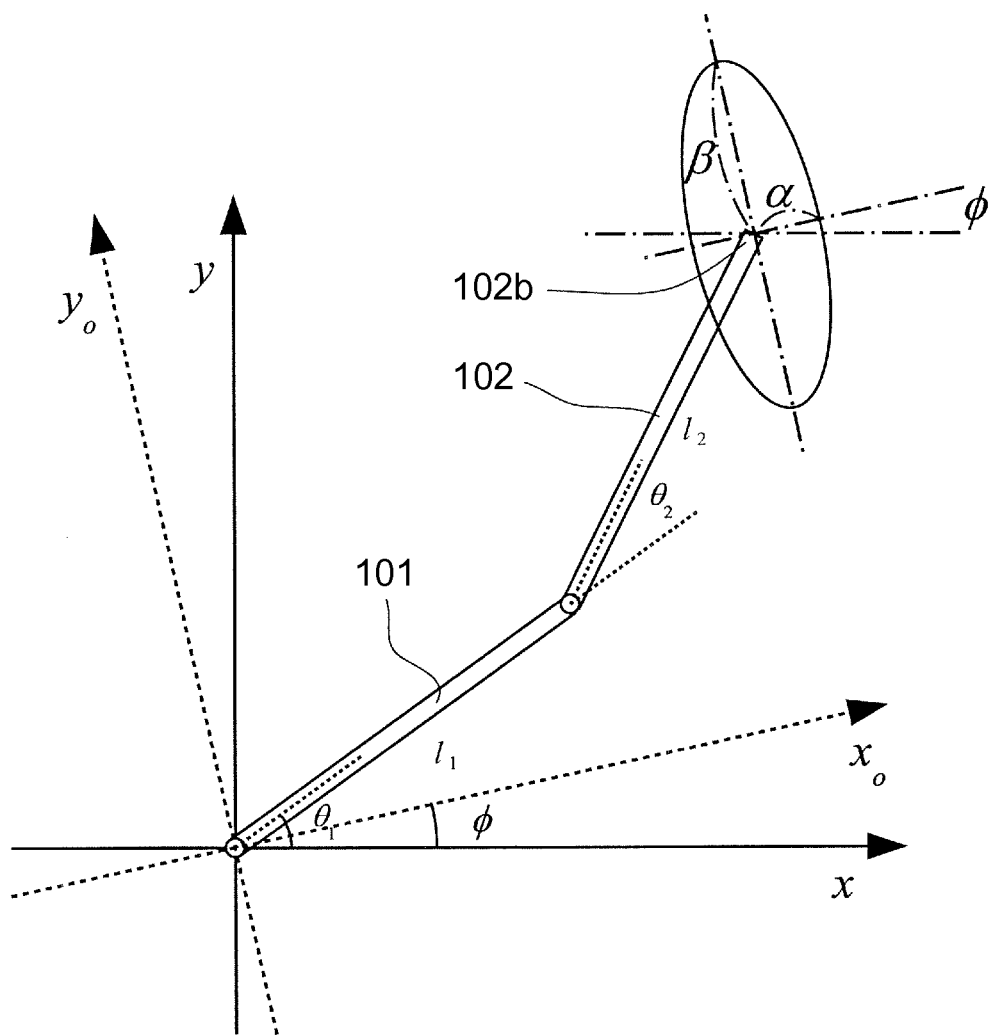
FIG. 4 is a view for describing a method of setting the stiffness ellipse.

Next, a method of adding a condition for rotating the ellipse by $\phi$ to the condition of setting the short radius of the ellipse as $\alpha$ and the long radius as $\beta$ will be described. As illustrated in FIG. 4, an $x_o$-$y_o$ coordinate system that is obtained by rotating the x-y coordinate by $\phi$ is used. If the stiffness instruction values $U_1$, $U_2$, and $U_3$ by which the stiffness ellipse becomes parallel to the $x_o$-$y_o$ coordinate system are obtained, the stiffness ellipse has a tilt of $\phi$, as viewed from the original x-y coordinate.

In the present embodiment, the second swing angle $\theta_2$ is set as the relative angle of the second link 102 with respect to the first link 101. Accordingly, in order to obtain the stiffness instruction values $U_1$, $U_2$, and $U_3$ by which the stiffness ellipse becomes parallel to the $x_o$-$y_o$ coordinate system, the first swing angle $\theta_1$ in the equations (15) to (17) is replaced by a value obtained by subtracting the tilt $\phi$ from the first swing angle $\theta_1$, the value being expressed by an equation below, $$\theta_1 \rightarrow \theta_1 - \phi \quad (18)$$

and the obtained value may be substituted into the equations (15) to (17).

Figure 5:
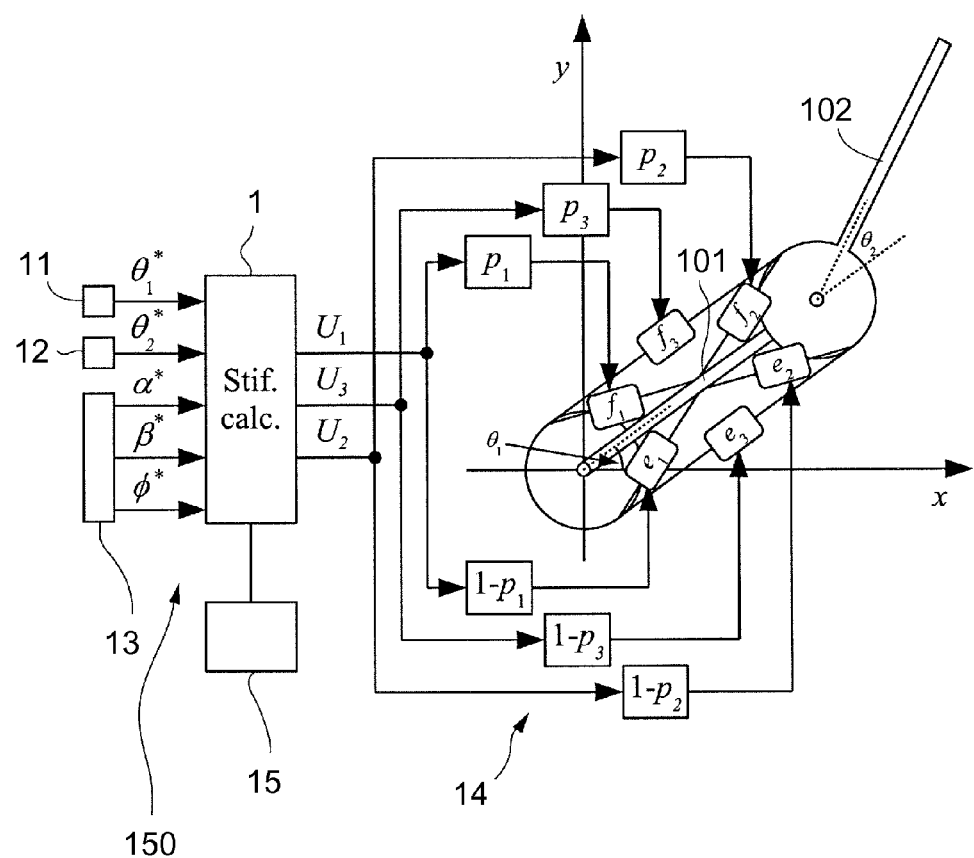
FIG. 5 is a block diagram illustrating a controlling device of the robot apparatus.

A controlling device 150 of the robot apparatus 100 according to the present embodiment will be described below. FIG. 5 is a block diagram illustrating the controlling device 150, which creates the stiffness ellipse, according to the present embodiment.

The controlling device 150 has a first swing angle detecting sensor 11 that detects the first swing angle of the first link 101 with the x axis, which is the reference axis, being defined as the reference axis, and outputs a signal indicating a value $\theta_1^*$ of the first swing angle. The controlling device 150 also has a second swing angle detecting sensor 12 that detects the second swing angle of the second link 102 with the axis, which extends in the longitudinal direction of the first link 101, being defined as the reference axis, and outputs a signal indicating a value $\theta_2^*$ of the second swing angle.

The swing angle detecting sensors 11 and 12 are sensors such as a potentiometer or encoder. Although not illustrated in FIG. 1, the first swing angle detecting sensor 11 is mounted at the first joint between the pulley 103 and the link 101 for detecting the angle of the first joint. Although not illustrated in FIG. 1, the second swing angle detecting sensor 12 is mounted at the second joint between the first link 101 and the second link 102 for detecting the angle of the second joint.

The controlling device 150 also includes a terminal 13 that outputs a signal indicating a value $\alpha^*$ of the target stiffness coefficient in the short axis direction, which is the target short radius of the stiffness ellipse, and outputs a signal indicating a value $\beta^*$ of the target stiffness coefficient in the long axis direction, which is the target long radius of the stiffness ellipse, according to an operation of an operator. The terminal 13 also outputs a signal indicating a value $\phi^*$ of a target tilt angle according to the operation by the operator. The value $\phi^*$ of the target tilt angle is the value of the target tilt angle of one (e.g., short axis) of the long axis and the short axis of the stiffness ellipse, wherein the x axis that is the reference axis of the x-y orthogonal coordinate system is specified as a reference.

The controlling device 150 also includes a controlling unit 1 that acquires the signals indicating the values $\theta_1^*$ and $\theta_2^*$ of the swing angles from the swing angle detecting sensors 11 and 12, and acquires the signals indicating the values of $\alpha^*$ and $\beta^*$ of the target stiffness coefficients and the value $\phi^*$ of the target tilt angle from the terminal 13. The controlling unit 1 has a CPU and a memory, thereby calculating the stiffness instruction values $U_1$, $U_2$, and $U_3$ from the acquired values by performing a calculation.

The controlling device 150 also includes a contraction force instruction value generating unit 14 that generates the contraction force instruction values $u_{en}$ and $u_{fn}$ of the actuators $e_1$, $f_1$, $e_2$, $f_2$, $e_3$, and $f_3$ of the respective pairs of actuators from the respective stiffness instruction values $U_1$, $U_2$, and $U_3$ calculated by the controlling unit 1. The contraction force instruction values $u_{en}$ and $u_{fn}$ (n=1, 2, 3) of the respective actuators are set to obtain the stiffness instruction value $U_n$ (n=1, 2, 3), whereby the stiffness ellipse can be formed, the ellipse having the value $\alpha^*$ of the short radius $\alpha$, the value $\beta^*$ of the long radius $\beta$, and the value $\phi^*$ of the tilt angle $\phi$.

The controlling unit 1 is configured to include a calculating unit 2, a subtracting unit 3, and a storing unit 4 as illustrated in FIG. 6. The storing unit 4 includes a nonvolatile memory such as a ROM or EEPROM. The first operational expression represented by the equation (15), the second operational expression represented by the equation (16), and the third operational expression represented by the equation (17) are preliminarily stored in the storing unit 4. The storing unit 4 has stored therein a control program that operates the CPU as the calculating unit 2. The first operational expression, the second operational expression, and the third operational expression may be incorporated in the control program, or the CPU that is operated according to the control program may refer to the respective operational expressions.

The first, second, and third operational expressions are those for calculating the stiffness instruction values $U_1$, $U_2$, and $U_3$, which are derived under the condition in which one (e.g., short axis) of the long axis and the short axis of the stiffness ellipse becomes parallel to the x axis, which is the reference axis on the x-y orthogonal coordinate system.

In the present embodiment, the first swing angle $\theta_1$, the second swing angle $\theta_2$, the stiffness coefficient $\alpha$ that is the short radius of the stiffness ellipse, and the stiffness coefficient $\beta$ that is the long radius of the stiffness ellipse in the respective operational expressions represented by the equations (15) to (17) are variables. The length $l_1$ of the first link 101 and the length $l_2$ of the second link 102 are fixed constants. The elastic force constant k, and the length r of the moment arm are also fixed constants. The target stiffness coefficients $\alpha$ and $\beta$ may be set as constants. In this case, the terminal 13 only outputs the target tilt angle $\phi$.

The subtracting unit 3 acquires the signal indicating the value $\theta_1^*$ of the first swing angle from the first swing angle detecting sensors 11 and a signal indicating the value $\phi^*$ of the target tilt angle from the terminal 13, and subtracts the value $\phi^*$ of the target tilt angle from the value $\theta_1^*$ of the first swing angle. The subtracting unit 3 sets the result of the subtraction as a new value $\theta_1^{*\prime}(=\theta_1^* - \phi^*)$ of the first swing angle, and outputs a signal indicating the new value $\theta_1^{*\prime}$ of the first swing angle.

As described above, the correction of subtracting the value $\phi^*$ of the target tilt angle from the value $\theta_1^*$ of the first swing angle from the first swing angle detecting sensor 11 is made, whereby the orthogonal coordinate system, which is the reference of the stiffness ellipse, is rotated by the angle $\phi^*$. Specifically, the first operational expression, the second operational expression, and the third operational expression have the $x_o$-$y_o$ orthogonal coordinate system illustrated in FIG. 4 as a reference, and since the subtracting unit 3 makes a subtracting calculation of $\theta_1^* - \phi^*$, the coordinate system is converted into the original x-y orthogonal coordinate system. Since the value $\theta_2^*$ of the second swing angle of the second link 102 is made with the first link 101 being defined as a reference, the value is unchanged, even if the coordinate system rotates. Therefore, this value does not have to be corrected.

The calculating unit 2 acquires a signal indicating the corrected value $\theta_1^{*\prime}$ of the first swing angle from the subtracting unit 3, a signal indicating the value $\theta_2^*$ of the second swing angle from the second swing angle detecting sensor 12, and acquires the signal indicating $\alpha^*$, $\beta^*$, and $\phi^*$ of the target stiffness coefficients and the target tilt angle from the terminal 13.

The calculating unit 2 substitutes the acquired values into the operational expressions represented by the equations (15) to (17) stored in the storing unit 4 ($\theta_1 = \theta_1^{*\prime}$, $\theta_2 = \theta_2^*$, $\alpha = \alpha^*$, $\beta = \beta^*$), so as to calculate the stiffness instruction values $U_1$, $U_2$, and $U_3$.

The calculating unit 2 acquires the signal indicating the value $\theta_1^{*\prime}(=\theta_1^* - \phi^*)$ of the first swing angle from the subtracting unit 3, which means the calculating unit 2 obtains the respective stiffness instruction values $U_1$, $U_2$, and $U_3$ by which the stiffness ellipse obtained by tilting the axis by the value $\phi^*$ of the target tilt angle is formed by using the operational expressions. Specifically, the calculating unit 2 calculates the stiffness instruction values $U_1$, $U_2$, and $U_3$ in the case where the short axis of the ellipse is tilted from the x axis by the target tilt angle $\phi$, with the calculation amount equal to the calculation in the case where the value $\phi^*$ of the target tilt angle is 0 (in the case where the short axis of the ellipse is parallel to the x axis).

Even if the lengths $l_2$ and $l_2$ of two links 101 and 102 are different from each other, the calculating unit 2 can obtain the stiffness instruction values $U_1$, $U_2$, and $U_3$ by using the operational expressions (15) to (17) that are not obtained by a convergent calculation but algebraically obtained. Accordingly, the calculation load is reduced, whereby the stiffness ellipse can rapidly be obtained.

In the present embodiment, the contraction force instruction value generating unit 14 obtains the contraction force instruction values $u_{en}$ and $u_{fn}$, according to an equation (19) below satisfying the equation (5), from the derived stiffness instruction values $U_1$, $U_2$, and $U_3$.

$$\begin{cases} u_{fn} = p_n U_n \\ u_{en} = (1 - p_n) U_n \end{cases}, n = 1, 2, 3 \quad (19)$$

The parameter $p_n$ is a real number of 0 or more and 1 or less for distributing the contraction force to each of the opposing pair. If the contraction force instruction values $u_{en}$ and $u_{fn}$ are set so as to satisfy the stiffness instruction values $U_1$, $U_2$, and $U_3$ calculated by the calculating unit 2, a desired stiffness ellipse can be obtained. Therefore, the value of $p_n$ can arbitrarily be set within the range of 0 or more and 1 or less, so that it can be set according to a torque instruction value for swinging the links 101 and 102.

The robot apparatus 100 includes a display unit 15 that displays an image. The calculating unit 2 changes the value $\theta_1^{*\prime}(=\theta_1^* - \phi^*)$ of the first swing angle substituted into the respective operational expressions, i.e., the value $\theta_1^*$ of the first swing angle and the value $\theta_2^*$ of the second swing angle, with respect to the value $\phi^*$ of the target tilt angle acquired from the terminal 13. In this case, the calculating unit 2 allows the display unit to display an image indicating a region where the stiffness instruction values $U_1$, $U_2$, and $U_3$ calculated from the operational expressions assume positive values. Thus, an operator can visually grasp the postures of the links 101 and 102 that can be realized with respect to the value of the target tilt angle $\phi^*$.

(3) Simulation

Firstly, it will be described that an arbitral stiffness ellipse can be realized by the deriving method according to the embodiment of the present invention. The postures of the links, i.e., the values of the swing angles of the links 101 and 102, are defined as $\theta_1^* = 35$ [deg] and $\theta_2^* = 80$ [deg], and the lengths of the links 101 and 102 are defined as $l_1 = 0.5$ [m] and $l_2 = 0.7$ [m].

Figure 7A:
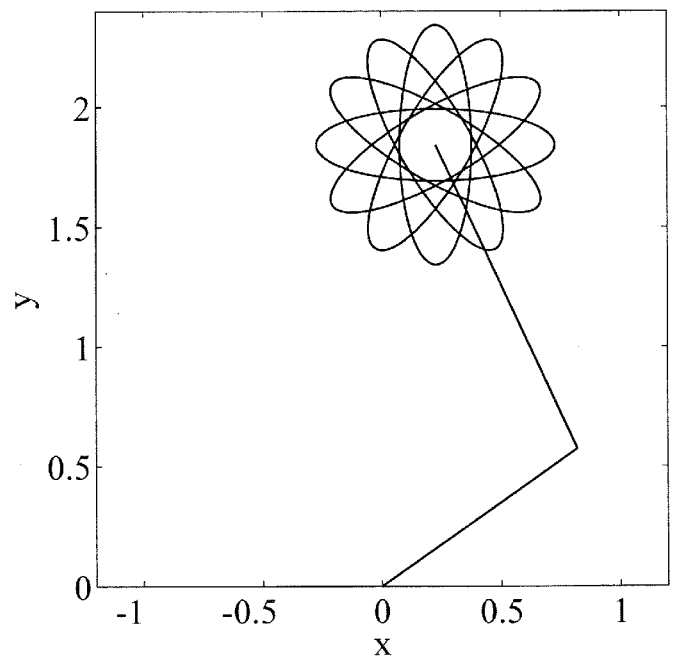
FIG. 7A is a view illustrating a simulation result in which a tilt angle of the stiffness ellipse is changed in case where a value of a target stiffness coefficient is set as $\alpha^*=30$ and $\beta^*=100$.

The values of the target stiffness coefficients in the working plane are set as $\alpha^* = 30$ and $\beta^* = 100$, and the value $\phi^*$ of the target tilt angle is substituted into the equations (15) to (17) and the equation (18) as being changed every 30 [deg], in order to obtain the stiffness instruction values $U_1$, $U_2$, and $U_3$. This is substituted into the equation (11), and the stiffness ellipse is plotted on the working plane. FIG. 7A illustrates the result. As another example, FIG. 7B illustrates the stiffness ellipse when the target stiffness coefficients are set as $\alpha^* = 10$, and $\beta^* = 100$.

Figure 7B:
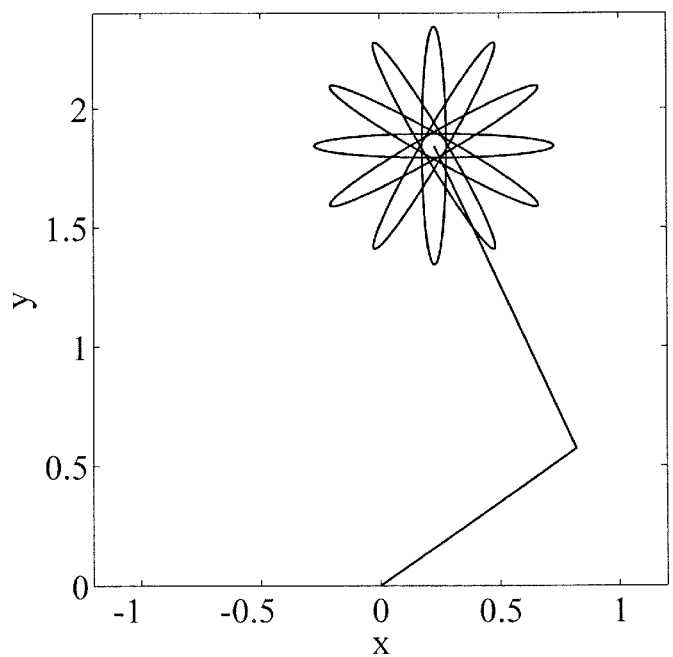
FIG. 7B is a view illustrating a simulation result in which a tilt angle of the stiffness ellipse is changed in case where a value of a target stiffness coefficient is set as $\alpha^*=10$ and $\beta^*=100$.

It is found from FIGS. 7A and 7B that the length of the axis of the stiffness ellipse is changed according to $\alpha^*$ and $\beta^*$, and the tilt is changed every 30 [deg]. Thus, it is found that, even if the lengths of two links are different from each other, the stiffness instruction values $U_1$, $U_2$, and $U_3$ for setting the stiffness ellipse to have arbitral long radius and short radius (stiffness coefficient) and tilt can be derived.

In FIGS. 7A and 7B, there is no restriction on the sign of the stiffness instruction values $U_1$, $U_2$, and $U_3$. However, it is difficult to realize a negative elastic force in the Mckibben artificial muscle actuator. From this, a posture angle of the manipulator that cannot realize a stiffness ellipse is present depending on the setting of the stiffness ellipse. In order to check the posture angle that can realize a stiffness ellipse, all of the values $\theta_1^*$ and $\theta_2^*$ of the swing angles may be substituted into the equations (15) to (17) and the equation (18) so as to extract the values $\theta_1^*$ and $\theta_2^*$ of the swing angles by which all of the stiffness instruction values $U_1$, $U_2$, and $U_3$ become positive.

Figure 8A:
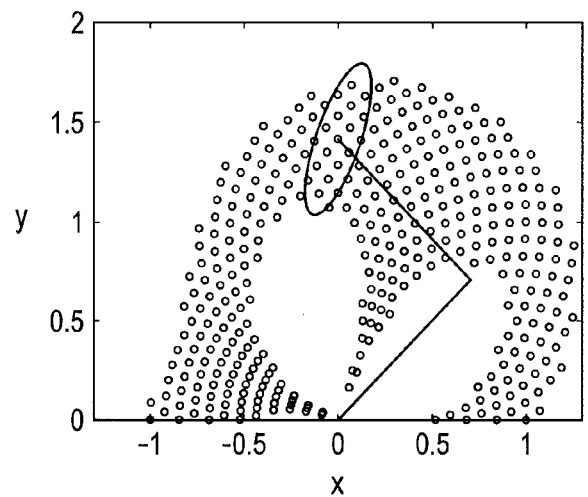
FIG. 8A is a view illustrating a simulation result when a value of a swing angle of each link is changed in case where set parameters $\{\alpha, \beta, \phi\}$ of the stiffness ellipse are set as $\{0.62, 2, -20\}$.
Figure 8B:
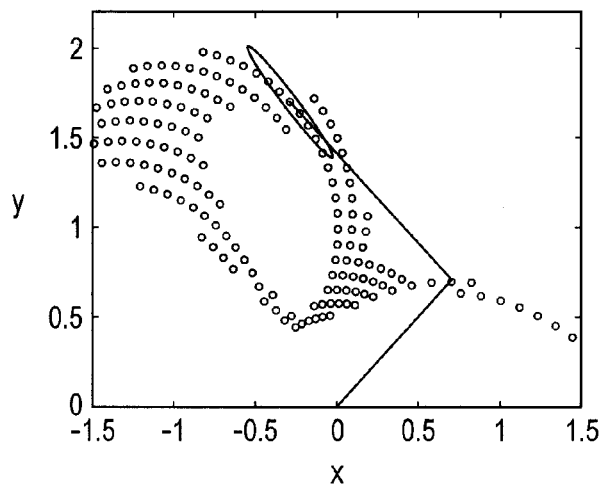
FIG. 8B is a view illustrating a simulation result when a value of a swing angle of each link is changed in case where set parameters $\{\alpha, \beta, \phi\}$ of the stiffness ellipse are set as $\{0.2, 2, 40\}$.
Figure 8C:
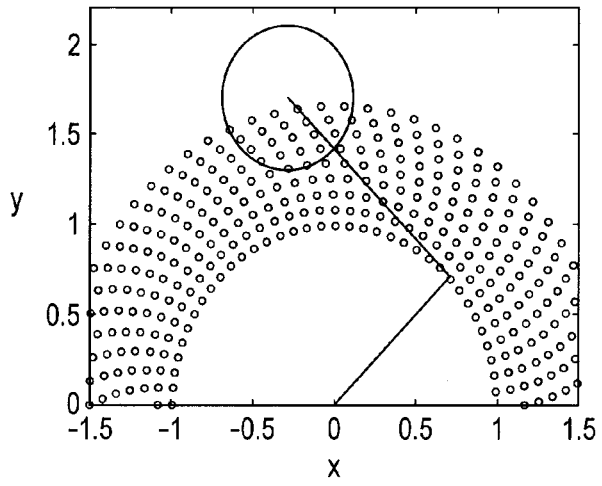
FIG. 8C is a view illustrating a simulation result when a value of a swing angle of each link is changed in case where set parameters $\{\alpha, \beta, \phi\}$ of the stiffness ellipse are set as $\{2, 2, 0\}$.

FIGS. 8A to 8C illustrate the range of the realizable swing angles, when the values $\theta_1^*$ and $\theta_2^*$ of the swing angles are changed from 0 degree to 180 degrees at 5-degrees interval with respect to the set parameters $\{\alpha, \beta, \phi\}$ of the stiffness ellipse, and substituted into the equations (15) to (17) and the equation (18). FIG. 8A illustrates the case in which the set parameters $\{\alpha, \beta, \phi\}$ of the stiffness ellipse are set as $\{0.62, 2, -20\}$. FIG. 8B illustrates the case in which the set parameters $\{\alpha, \beta, \phi\}$ of the stiffness ellipse are set as $\{0.2, 2, 40\}$. FIG. 8C illustrates the case in which the set parameters $\{\alpha, \beta, \phi\}$ of the stiffness ellipse are set as $\{2, 2, 0\}$.

In FIGS. 8A to 8C, the range of the realizable swing angles of the links 101 and 102 is indicated by o. If the tip 102b (hand) of the second link 102 is within the range of o, the set stiffness ellipse can be realized only by the elastic force of the artificial muscle actuator. It is found from FIGS. 8A and 8B that the range that can realize the stiffness ellipse is reduced, if the stiffness ellipse is set to be long and thin, and is set to have stiffness of the hand in a specific direction.

In order to perform a compliance control to disturbance in all directions, the stiffness ellipse may be formed into a precise circle as illustrated in FIG. 8C. However, it is found that the range of the posture angle for realizing the stiffness ellipse described above only by the setting of the elasticity of the muscle is limited.

Figure 9:
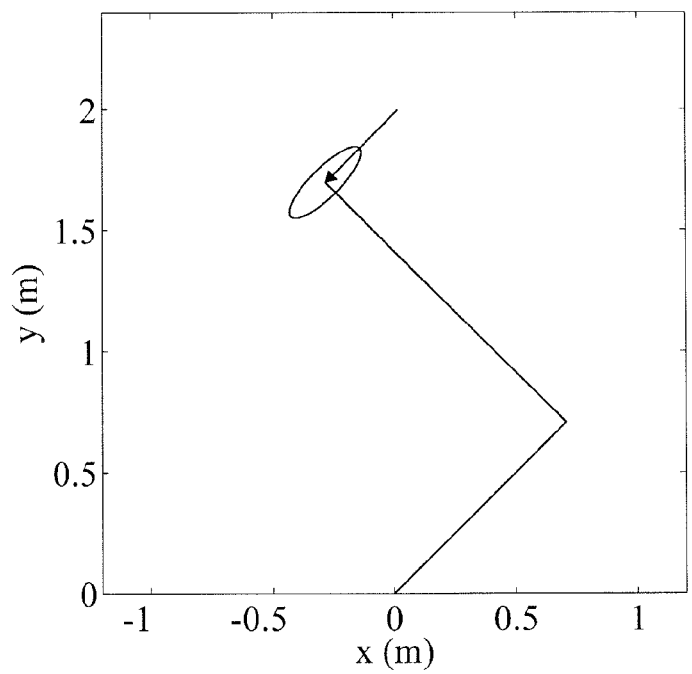
FIG. 9 is a view illustrating a simulation condition of the stiffness ellipse when an external force is applied to the tip of the second link.

Subsequently, a simulation is performed by using an equation of motion represented by the equation (2) and the equation (3), in order to verify the dynamic possibility of the set stiffness ellipse. As illustrated in FIG. 9, the posture of the manipulator is set as $\theta_1=45$ [deg], and $\theta_2=90$ [deg] so as to apply external force to the tip $102b$ (i.e., hand) of the second link 102 from a direction indicated by an arrow. If the stiffness ellipse is set such that the direction of the axis (the long axis in FIG. 9) of the stiffness ellipse becomes equal to the direction of the disturbance, the compliance control in which the hand has flexibility in the direction same as the direction of the disturbance is realized.

Therefore, the stiffness ellipse illustrated in FIG. 9 is set. The set parameters $\{\alpha, \beta, \phi\}$ are set as $\{75, 250, -45\}$. The stiffness instruction values $U_1$, $U_2$, and $U_3$ are obtained as $U_1=3.0$, $U_2=0$, and $U_3=19.6$ from the equations (15) to (17) and the equation (18). They are distributed according to the equation (19) with $p_n=0.5$ (n=1, 2, 3) so as to apply contraction force to the actuators $e_1$, $f_1$, $e_2$, $f_2$, $e_3$, and $f_3$.

Figure 10:
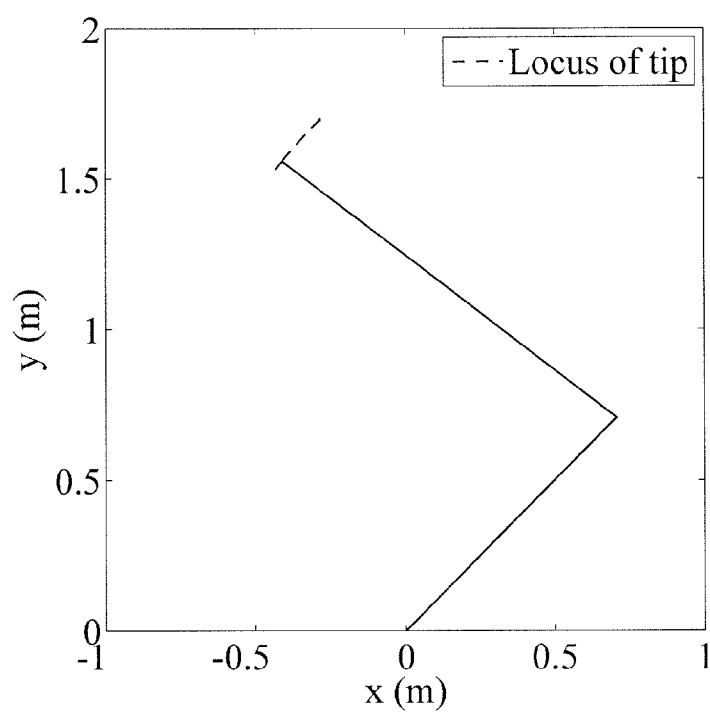
FIG. 10 is a view of a simulation result illustrating a locus of the tip of the second link, when an external force is applied to the tip of the second link under the condition of the stiffness ellipse illustrated in FIG. 9.

FIG. 10 illustrates a locus of the tip $102b$, when the external force is applied to the tip $102b$ of the second link 102. Even if the lengths of two links 101 and 102 are different from each other, the tip $102b$ (hand) has flexibility in the direction same as the direction of the external force, which shows that the compliance control that can provide a flexible contact with respect to the disturbance is realized.

The present invention has been described above with reference to the embodiment, but the present invention is not limited thereto. The above-mentioned embodiment describes the manipulator such as a working robot, but the present invention is applicable to a legged mobile robot.

The above-mentioned embodiment describes that the swing angles $\theta_1$ and $\theta_2$ of the links 101 and 102 are detected by the swing angle detecting sensors 11 and 12, and the detection result is used for the calculation of the stiffness instruction values as the values of the first and second swing angles, but the present invention is not limited thereto. The values of the first and second swing angles may be the value of the target swing angle, instead of the detection result, and in this case, the swing angle detecting sensors 11 and 12 may not be provided.

In the feed-forward control, the stiffness ellipse of the tip $102b$ of the second link 102 can be maintained without performing an electric feedback control, which provides an effect of realizing energy saving.

The above-mentioned embodiment describes that one of the long axis and the short axis of the stiffness ellipse is the short axis, but it may be the long axis. The above-mentioned embodiment describes that the x axis of the x-y orthogonal coordinate system is the reference axis, but the y axis may be the reference axis.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2010-212315, filed Sep. 22, 2010, and 2011-175521, filed Aug. 11, 2011, which are hereby incorporated by reference herein in their entirety.

What is claimed is:

1. A robot apparatus including: a first link that is made of a longitudinal member, and has a base end supported to a fixing member so as to be swingable; a second link that is made of a longitudinal member, and that has a base end supported to a tip of the first link so as to be swingable in a plane where the first link swings; a pair of first actuators that is connected to the fixing member and the first link for allowing the first link to swing owing to a difference in contraction forces between the first actuators; a pair of second actuators that is connected to the first link and the second link for allowing the second link to swing owing to a difference in contraction forces between the second actuators; and a pair of third actuators that is connected to the fixing member and the second link for allowing the first link and the second link to swing owing to a difference in contraction forces between the third actuators, the apparatus comprising:

a storing unit that preliminarily stores operational expressions that are derived under the condition that an orthogonal coordinate system is defined in the plane, a stiffness characteristic at the tip of the second link is represented by an ellipse having its center defined as the tip of the second link on the orthogonal coordinate system, and one of a long axis and a short axis of the ellipse is parallel to a reference axis of the orthogonal coordinate system, the operational expressions including: a first operational expression for obtaining a first stiffness instruction value $U_1$ expressed by Equation A, which indicates a sum of contraction force instruction values of the pair of first actuators, a second operational expression for obtaining a second stiffness instruction value $U_2$ expressed by Equation B, which indicates a sum of contraction force instruction values of the pair of second actuators, and a third operational expression for obtaining a third stiffness instruction value $U_3$ expressed by Equation C, which indicates a sum of contraction force instruction values of the pair of third actuators, wherein a first swing angle of the first link with the reference axis being defined as a reference and a second swing angle of the second link with an axis extending in the longitudinal direction of the first link being defined as a reference are specified as variables, and the length of the first link and the length of the second link are specified as constants;

a subtracting unit that acquires a signal indicating a value of the first swing angle of the first link and a signal indicating a value of a target tilt angle of one axis with the reference axis being defined as a reference, and outputs a signal indicating a new value of the first swing angle, the new value being specified as the result obtained by subtracting the value of the target tilt angle from the value of the first swing angle;

a calculating unit that acquires a signal indicating the value of the first swing angle output from the subtracting unit and a signal indicating the value of the second swing angle of the second link, and calculates the first stiffness instruction value, the second stiffness instruction value, and the third stiffness instruction value from the first operational expression, the second operational expression, and the third operational expression stored in the storing unit; and a contraction force instruction value generating unit that generates contraction force instruction values of each of the pair of first actuators, the pair of second actuators, and the pair of third actuators from the stiffness instruction values calculated by the calculating unit, Equation A:
$U_1 = \{(\beta-\alpha)l_1l_2 \cos(5\theta_2+2\theta_1)+(\beta-\alpha)l_1^2 \cos(4\theta_2+2\theta_1)+(\beta-\alpha)l_1^2 \cos(4\theta_2-2\theta_1) +(4\alpha-4\beta)l_1l_2 \cos(3\theta_2+2\theta_1)+(\beta-\alpha)l_1l_2 \cos(3\theta_2-2\theta_1)+(4\alpha-4\beta)l_1^2 \cos(2\theta_2+2\theta_1) +(4\alpha-4\beta)l_1^2 \cos(2\theta_2+2\theta_1)+(6\beta-6\alpha)l_1l_2 \cos(\theta_2-2\theta_1)+(4\alpha-4\beta)l_1l_2 \cos(\theta 2+$ $2\theta_1) +(\beta+\alpha)l_1l_2 \cos(5\theta_2) +(2\beta+2\alpha)l_1^2 \cos(4\theta_2)+(-3\beta-3\alpha)l_1l_2 \cos(3\theta_2) +(-8\alpha-8\beta)l_1^2 \cos(2\theta_2)+(2\beta-2\alpha)l_1l_2 \cos(\theta_2)+ (6\alpha-6\beta)l_{12} \cos(2\theta_1)+(6\beta+6\alpha)l_1^2\}/ \{kr^2 \cos(4\theta_2)-4kr^2 \cos(2\theta_2)+3kr^2\}$, Equation B:
$U_2=\{(\beta-\alpha)l_1l_2 \cos(5\theta_2+2\theta_1)+(4\beta-4\alpha)l_1l^2 \cos(3\theta_2+2\theta_1)+ (\beta-\alpha)l_{12} \cos(3\theta_2-2\theta_1) +(6\beta-6\alpha)l_1l_2 \cos(\theta_2+2\theta_1)+(4\alpha-4\beta)l_1l_2 \cos(\theta_2-2\theta_1)+(\beta-\alpha)l_{12} \cos(5\theta_2) +(-3\beta-3\alpha)l_{12} \cos(3\theta_2)+ (2\beta+2\alpha)l_1l_2 \cos(\theta_2)\}/ \{kr^2 \cos(4\theta_2)-4kr^2 \cos(3\theta_2)+3kr^2\}$, Equation C:
$U_3=\{(\beta-\alpha)l_2^2 \cos(6\theta_2+2\theta_1)+(\beta-\alpha)l_1l_2 \cos(5\theta_2+2\theta_1)+ (4\alpha-4\beta)l_2^2 \cos(4\theta_2-2\theta_1) +(4\alpha-4\beta)l_1l_2 \cos(3\theta_2+2\theta_1)+(\beta-\alpha)l_1l_2 \cos(3\theta_2-2\theta_1)+(6\beta-6\alpha)l_{12} \cos(2\theta_2+2\theta_1) +(\beta-\alpha)l_2^2 \cos(2\theta_2-2\theta_1)+(6\beta-6\alpha)l_1l_2 \cos(\theta_2+2\theta_1)+(4\alpha-4\beta)l_{12} \cos(\theta_2-2\theta_1) +(\beta-\alpha)l_1l_2 \cos(5\theta_2)+(2\beta-2\alpha)l_2^2 \cos(4\theta_2)+(-3\beta-3\alpha)l_{12} \cos(3\theta_2) +(-8\beta-8\alpha)l_2^2 \cos(2\theta_2)+(2\beta+2\alpha)l_1l_2 \cos(\theta_2)+(4\alpha-4\beta)l_2^2 \cos(2\theta_1)+(6\beta+6\alpha)l_2^2\}/ \{kr^2 \cos(4\theta_2)-4kr^2 \cos(2\theta_2)+3kr^2\}$, where $\alpha$ is a value obtained by dividing a length of the short axis by two, $\beta$ is a value obtained by dividing a length of the long axis by two, $l_1$ is a link length of the first link, $l_2$ is a link length of the second link, $\theta_1$ is a swing angle of the first link, $\theta_2$ is a swing angle of the second link, and k is a value obtained by dividing a spring coefficient of an elastic component of the first, the second, or the third actuator by a contraction force of a force generating component of the first, the second, or the third actuator.

2. A robot apparatus according to claim 1, further comprising:

a first swing angle detecting sensor that detects the first swing angle of the first link with the reference axis being defined as a reference; and a second swing angle detecting sensor that detects the second swing angle of the second link with the axis extending in the longitudinal direction of the first link being defined as a reference, wherein the subtracting unit acquires the signal indicating the value of the first swing angle of the first link from the first swing angle detecting sensor, and the calculating unit acquires the signal indicating the value of the second swing angle of the second link from the second swing angle detecting sensor.

3. A robot apparatus according to claim 1, further comprising a terminal that outputs the signal indicating the value of the target tilt angle of one axis according to an operation by an operator.

4. A robot apparatus according to claim 1, further comprising: a display unit that displays an image, wherein the calculating unit allows the display unit to display an image representing a region where the stiffness instruction values calculated from the operational expressions assume a positive value, when the value of the first swing angle of the first link and the value of the second swing angle of the second link are changed with respect to the value of the target tilt angle of one axis acquired from the terminal.

5. A robot apparatus according to claim 1, wherein the stiffness ellipse is set such that the stiffness ellipse has an axis parallel to a direction of an input external force when the external force is input to the tip of the second link.

6. A robot apparatus according to claim 1, wherein the $U_1$, $U_2$, and $U_3$ maintain constant values from when an external force is applied to the tip of the second link to when the application of the external force to the second link is stopped.

* * * * *